May 10, 1966 J. E. LYON ETAL 3,250,830
PRILLING
Filed June 13, 1962
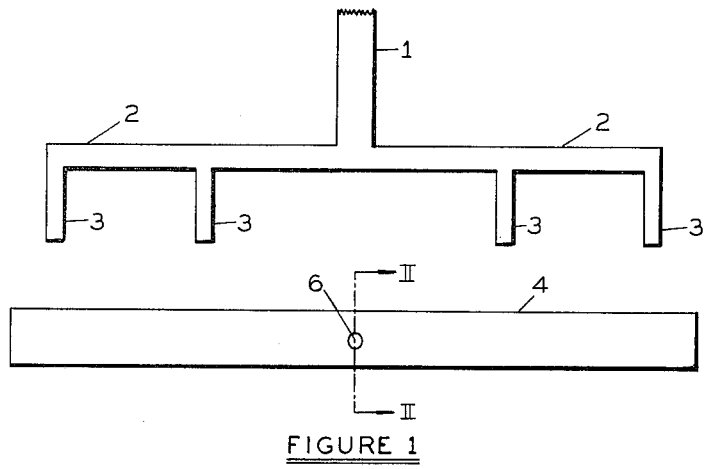
FIGURE 1
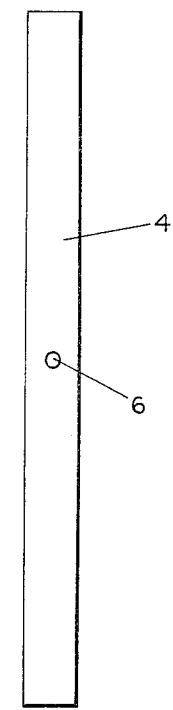
FIGURE 2
FIGURE 3
JOHN E. LYON
JOSEPH Q. SNYDER
MARION D. BARNES
INVENTORS
BY
ATTORNEY

United States Patent Office 3,250,830
Patented May 10, 1966

3,250,830
PRILLING
John E. Lyon, Florissant, Joseph Q. Snyder, St. Charles, and Marion D. Barnes, Glendale, Mo., assignors to Monsanto Company, a corporation of Delaware
Filed June 13, 1962, Ser. No. 202,301
11 Claims. (Cl. 264—9)

This invention relates to the formation of spheres and spheroids from a liquid material and particularly to an improved process and apparatus for prilling solidifiable liquids.

Various methods of spheroidizing chemical compounds or compositions by solidifying small drops of the molten or dissolved substances presently enjoy widespread usage. Prilling in accordance with these previous methods normally entails flowing the liquid through a plate containing a large number of minute orifices and solidifying the droplets thus formed by suspending them in a gaseous cooling or drying medium until they have become solidified. This is most conveniently accomplished by passing the liquid material through drop forming orifices located at the top of a relatively tall tower which may have a height up to about 200 feet. In passing through the tower, preferably counter-current to an updraft of air or other inert cooling and/or drying media, the droplets are cooled below their melting point and the solvent, if present, removed therefrom. The solidified droplets or prills are then collected at the base of the tower for packaging or further processing.

Substantially all of the previously known prilling methods are dependent for their success upon the utilization of smal orifices or nozzles. Such orifices normally are circular and have a diameter between about 0.02 and 0.04 inch. Prior attempts to use orifices larger than about 0.4 inch have been impractical. Such small orifices are quite prone to clogging and also to erosion. The major problem inherent to such orifice plates is the matter of clogging; and particular care, such as preliminary filtering and the like, must be employed to insure that no solid extraneous matter is present in the liquid material being processed. Thus the prilling methods now in common usage are definitely restricted to the treatment of liquids and are not adaptable to the processing of liquid-solid mixtures. Therefore, prior to the advent of the present invention, prilling methods were reliant on the use of a multiplicity of exceedingly small orifices which are expensive to make, difficult to maintain in operation and which cannot be used in prilling slurries containing suspended solid particles.

Therefore, it is an object of the present invention to provide new and novel prilling methods and apparatus overcoming the disadvantages of the prior art. It is also an object of the present invention to provide improved processes and apparatus for the formation of spherical particles from solidifiable liquids which may have an appreciable content of undissolved solids.

In accordance with this invention, these and other objects are accomplished, generally speaking, by separating a stream of a solidifiable liquid, which may or may not have solid particles suspended therein, into discrete droplets by means of a vibrating member. The vibrating member is substantially planar and may be circular, elliptical or polygonal. More specifically this invention contemplates the utilization of a bar or reed vibrating at an angle to the stream flow so as to break the stream into a multiplicity of droplets which are subsequently solidified. The liquid being treated can be either a concentrated solution which is readily flowable at normal temperatures, a molten solution or a chemical substance or mixture heated to a temperature above its melting point. When a solution is being processed, the droplets formed are solidified by removal of substantially all of the solvent therefrom. Likewise molten compositions are solidified by cooling the droplets below their solidification point. In either event, the solidification is accomplished by contacting the droplets with an inert gaseous medium and maintaining them suspended within such medium until solidification is effected by cooling and/or solvent removal.

The vibrating member oscillates back and forth at an angle to and preferably across the radial axis of the stream so that the liquid contacts its lateral surfaces and is thus dispersed into droplets which are then solidified. The vibrating member employed is preferably a relatively long, slender bar having a length many times greater than its width and having minimum thickness. The longitudinal axis of the bar can be parallel to the longitudinal axis of the stream flow, perpendicular thereto, or can form an acute angle with the stream flow. The angle at which the stream of solidifiable liquid impinges on the bar is not particularly critical. However, the angle of incidence must be sufficiently small that the droplets formed and reflected from the bar will not interfere with the feed stream. To avoid such interference, it is generally necessary to maintain the angle of incidence at a value not exceeding about 75°. Preferably, however, the bar is so positioned that when in a stationary position it substantially bisects the liquid stream, and vibration imparted to the bar by any suitable oscillator, vibrator or the like is at right angles to the stream flow. Thus substantially equal portions of the stream contact each lateral surface of the vibrating bar and are dispersed therefrom in the form of droplets. When the longitudinal axis of the vibrating member forms an acute angle with the longitudinal axis of the stream, the subdividing action of the member is necessarily restricted to one lateral surface of the member. With such an arrangement, however, separate streams can be directed to each lateral surface of the vibrating member.

The size of the orifice or nozzle used in accordance with the present invention is not particularly critical and depends primarily on the production rate of prilling desired. In order to obtain the maximum benefits of the invention it is preferred, however, to utilize nozzles or outlets having a minimum dimension of at least approximately ⅛ of an inch. This permits the efficient handling of most solidifiable liquids including those which may contain sufficient solid material to be in the form of a thick slurry. While the outlet dimensions can be increased to any size that may be desired, for most practical applications it is preferred to employ nozzles having a maximum dimension not significantly in excess of about 1 inch. This permits a very high production rate and at the same time does not require an inordinately large installation. Thus in most instances it is preferred to use orifices having a major dimension between about ⅛ and 1 inch. For the sake of convenience and economy, circular or cylindrical nozzles are employed. However, for some particular applications nozzles of different cross-sectional configurations can be utilized with equal facility.

In most industrial applications, the nozzle or nozzles are so positioned that the stream of liquid directed therefrom flows in a downwardly direction. The vibrating bar is then positioned under the nozzle and the droplets formed by the bar fall freely as in the conventional prilling operations. However, the direction in which the nozzles are directed can be varied considerably. For example, they can also direct the fluid upwardly, horizontally or at an angle with the horizontal. The only modification required when their direction deviates from a downward path is the application of additional pressure to the liquid before it leaves the nozzle feeder system.

This pressure can be imparted by means of a conventional pump or by a hydrostatic head.

In any event, the vibrating member is so positioned that the stream of liquid emerging from the nozzle impinges upon the member. The vibrating member is advantageously positioned in proximity to the nozzle, but the distance between the outlet and the member can vary considerably. The member should be sufficiently removed from the nozzle so that the nozzle will not be subjected to excessive splashing of the liquid from the member. On the other hand the bar must be sufficiently close to the nozzle to insure that the stream impinging upon it is still cohesive and has substantially the same configuration and size as the orifice outlet. Thus the distance between the nozzle and the vibrating member will necessarily depend upon the particular material being processed. In most instances, however, it is preferred to maintain this distance between about 8 and about 25 outlet diameters. For example, when utilizing nozzles having an inside diameter of approximately ⅛ inch, the distance between the nozzle and the vibrating member should generally be maintained between about one and three inches.

The vibrating member is preferably in the form of a long thin strip and is vibrated through a plane substantially perpendicular to the plane of the strip. The strip or bar can be formed of any material stable under operating conditions and inert to the material being processed. While it is preferred to utilize the various stainless steels in this capacity, other structural materials and particularly metals such as iron, spring steel, aluminum, spring bronze, and the like can be used. The particular configuration of the vibrating strip is not particularly critical but most conveniently it is in the form of an elongated rectangle having substantially parallel side walls. The surfaces joining the lateral surfaces of the strip can be square. When the liquid stream passes over these leading edges, however, they may be advantageously tapered or rounded to minimize the amount of liquid material which would otherwise come into contact with and be deflected by a blunt edge of the bar.

The size requirements of the bar are not absolute but are dependent upon the size of the orifice and the rate of operation. While it is preferred to employ vibrator strips having a minimum thickness, the thickness of the strip can be as large as the diameter of the nozzle used with it. But the thickness of the strip must not appreciably exceed the diameter of the nozzle so as to prevent contact of excessive portions of the stream with the top edge of the bar. When the longitudinal axis of the bar is perpendicular to the stream flow, the optimum of the bar is determined from the rate of fluid flow. Thus relatively wide strips are employed when the fluid flow is rapid to insure that substantially all of the liquid being processed is acted upon by the lateral surfaces of the strip.

The frequency of vibration is roughly inversely proportional to the thickness of the strip. The amplitude should be sufficiently great to insure that substantially all of the liquid being subdivided is effectively acted upon by at least one of the lateral surfaces of the strip. Since each material of construction has an optimum fundamental frequency based upon its particular characteristics, the frequency employed is also dependent upon the composition of the bar. These optimum fundamental frequencies can be readily approximated by the following formula:

$$v_1 = \frac{0.55966}{l^2} \sqrt{\frac{Qk^2}{r}}$$

where $v_1$ = frequency (fundamental)
$l$ = length of bar in cm.
$Q$ = elastic constant of material
$k$ = radius of gyration
$r$ = density of material The above formula relates to the fundamental frequency of vibration. The relationships between the fundamental frequency and other frequencies of the same bar are expressed in the following equations:

$$v_2 = 6.767 v_1$$
$$v_3 = 17.548 v_1$$
$$v_4 = 34.387 v_1$$

Generally speaking, it is preferred to maintain the frequency of vibration at a level between about 20 and about 2000 c.p.s.

The amplitude of vibration is readily controlled by means of a vibrator and generally varies directly with the rate of fluid flow. The vibration is imparted to the strip or bar by any conventional vibrator centrally attached to the strip by means of a rigid rod secured to both elements. This connecting rod is generally in a plane substantially perpendicular to the plane of the strip and forms the sole support for the strip. Since both ends of the bar are free a series of nodes and antinodes are set up along the bar.

When the process of this invention is executed using a vibrating reed or bar which bisects the stream and has its longitudinal axis substantially perpendicular to the liquid stream, a plurality of nozzles are employed with each nozzle being directed over one antinode. Thus when the bar is perpendicular to and bisects the stream, the stream impinges upon the bar at its points of maximum amplitude. With a relatively short bar, say less than 10 inches long, four antinodes are established along its length and it is possible to employ four ⅛ inch nozzles. When the bar is positioned with its longitudinal axis substantially parallel to the stream flow but bisecting it, just one nozzle per bar is employed. With this modification of the invention, less vibratory power is required per bar and a portion of the stream is directed away from the bar at each antinode with the last fraction of the stream being subdivided by the antinode most remote from the nozzle exit.

The invention will be more readily understood by reference to the following examples taken in connection with the attached drawing in which—

FIGURE 1 is a schematic side elevation of apparatus employed in accordance with the present invention, FIGURE 2 is a cross-sectional view taken along the line II—II of FIGURE 1 and FIGURE 3 is a schematic side elevation illustrating another embodiment of the invention.

A molten ammonium nitrate composition containing between about 0.5 and 1% water is prepared by vacuum drying a relatively dilute solution obtained by the neutralization of ammonia with nitric acid. While any suitable method of drying the ammonium nitrate can be employed, it has been found that the dehydration process set forth in U.S. Patent 3,030,179 granted April 17, 1962, to McFarlin and Stites is particularly satisfactory. The molten ammonium nitrate is introduced into a storage tank (not shown) positioned above and in fluid flow relationship with the prilling header system of the present invention to provide the system with a hydrostatic head. The distribution prilling header system is centrally located in the upper portion of a conventional prilling tower having a height of approximately 175 feet. The molten ammonium nitrate is conveyed from the tank to a plurality of nozzles 3 by means of header 1 and lateral feed lines 2. The molten ammonium nitrate maintained at a temperature between about 170° C. and about 200° C. then emerges from nozzles or outlets 3 in the form of cylindrical streams. Nozzles 3 are right cylindrical and in this particular example have an internal diameter of approximately ¼ inch while the internal diameter of header 1 and lateral feed lines 2 are sufficient to provide steady streams of molten ammonium nitrate through the nozzles. The streams emerging from the nozzles fall about one inch and then impinge upon the leading edge of bar 4. The bar of this embodiment is formed of 316 stainless steel and is about 9¾ inches long, about 2 inches wide and approximately ⅛ inch thick. This bar is vibrated at a frequency of about 800 cycles per second with an amplitude of approximately ½ inch. As particularly well shown in FIGURE 2, the vibratory motion as imparted to bar 4 by means of a conventional vibrator 5 through rod 6, which forms a rigid connection between them. This vibration of the bar results in the formation of antinodes or areas of maximum vibration located substantially below each of the nozzles, and the bar is positioned so as to bisect the streams emerging from the nozzles. Thus when the vibratory motion is applied to the bar, the bar moves rapidly back and forth through the stream, portions of which are alternately contacted by either side of the bar. This causes the streams to be broken up or subdivided into a multiplicity of finely divided droplets. The droplets thus formed are allowed to fall through the tower to its base for a distance of approximately 175 feet. During the fall of the droplets they pass through an inert gaseous cooling medium such as air, which is preferably flowing counter-current to the ammonium nitrate droplets. In this embodiment the air introduced at the base of the tower is at ambient temperature. The droplets are solidified during their fall and are collected at the bottom of the tower. The solidified droplets or prills thus formed are removed from the tower and dry-screened to remove all particles retained on an 8 mesh U.S. Standard sieve screen and also those passing through a 20 mesh screen. The material between 8 and 20 mesh, which represents approximately 90% of the product, is then packaged for use as a fertilizer, while the off-size material is returned for reprocessing.

The process of the present invention can also be employed using a vibrating bar having its longitudinal axis substantially parallel to the stream flow. A modification of this nature will be described in connection with FIGURE 3 of the drawing. As shown in this figure nozzle 3 is positioned directly above bar 4. The nozzle is in fluid flow relationship with a conventional storage tank (not shown) positioned above the nozzle to provide it with a hydrostatic head. A substantially anhydrous molten ammonium nitrate composition of the type described in the preceding example is charged into the tank, flows through the nozzle in a steady cylindrical stream, and impinges upon bar 4. The bar is substantially parallel to the stream flow and when at the rest bisects the molten ammonium nitrate stream. The dimensions of the bar and nozzle are substantially the same as those set forth in the preceding example. Also as set forth above, the bar vibrates at a frequency of approximately 800 c.p.s. with an amplitude of approximately ½ inch. The vibrating motion is of such a nature that antinodes are set up relatively close to either end of the bar and also at points equidistant from the center and either end of the bar. A portion of the ammonium nitrate emerging from the nozzle is dispersed into droplets upon contact with the lateral surfaces of the bar near its leading edge. That portion of the ammonium nitrate which is not initially dispersed flows down the bar and is subdivided as it passed over the three remaining antinodes on the bar. The ammonium nitrate droplets thus formed are solidified and screened in substantially the same manner as set forth in the preceding example.

The products obtained in accordance with the above examples are solid, dense, substantially spherical, free-flowing particles. This material is readily handled in all types of automatic conveying, weighing and packaging apparatus and is thus well suited for subsequent commercial treatment or for use per se as a fertilizer.

In order to illustrate the adaptability of the present invention to the formation of spherical particles from a liquid material having solids suspended therein, the procedure of the first example is substantially repeated using a molten ammonium nitrate composition containing approximately 40% of −200 mesh agricultural limestone suspended therein. No significant modification of the process is required with this material containing a large amount of insoluble solid components. The material thus obtained has substantially the same size and external configuration as that described in accordance with the foregoing examples. However, each prill consists of a matrix of solidified ammonium nitrate containing uniformly dispersed particles of agricultural limestone.

While the above examples are directed specifically to the treatment of ammonium nitrate, it will be readily appreciated that the process and apparatus of the present invention are equally applicable to any solidifiable liquid material capable of a definite rapid transition from the liquid to the solid state. Substances that can be processed in this manner include fusible and/or soluble inorganic compounds, such as the nitrates, halides, sulfates and phosphates of the alkaline earth and alkali metals, and the like; organic materials including benzoic acid, phthalic acid, maleic acid, thermoplastic resins, high melting point waxes, urea, phenols, substituted phenols such as pentachloro and para-dichloro phenols, synthetic detergents, wetting agents and other fusible or soluble chemical compounds or compositions. In addition, the process is applicable to elemental substances such as lead, magnesium, sulfur and the like.

Numerous modifications will readily suggest themselves to those skilled in the art. Thus, while the invention has been described with particular reference to specific embodiments, it is to be understood that it is not to be limited thereto but is to be construed broadly and restricted solely by the scope of the appended claims.

The embodiments of the invention in which an exclusive property or privilege is claimed are defined as follows:

1. A process of forming solid spheres and spheroids from a solidifiable liquid which comprises flowing a stream of liquid into contact with the lateral surfaces of a reed substantially bisecting the stream, vibrating the reed to form droplets of liquid, and subsequently solidifying the droplets.

2. A process of forming solid spheres and spheroids from a solidifiable liquid which comprises flowing a stream of the liquid into contact with the lateral surfaces of a reed, the reed substantially bisecting the stream, vibrating the reed at a frequency between about 20 and about 2000 cycles per second to form droplets of liquid, and subsequently solidifying the droplets.

3. A process of forming solid spheres and spheroids from a solidifiable liquid which comprises flowing a stream of the liquid from a liquid outlet into contact with the lateral surfaces of a reed, the thickness of the reed being less than the inner dimension of the outlet, the reed substantially bisecting the stream, vibrating the reed at a frequency between about 20 and about 2000 cycles per second to form droplets of the liquid, with the amplitude of vibration being greater than the inner dimension of the outlet, and subsequently solidifying the droplets.

4. A process of forming solid spheres and spheroids from a solidifiable liquid which comprises flowing a stream of the liquid from an outlet into contact with the lateral surfaces of a reed having a thickness less than the inner dimension of the outlet, the longitudinal axis of the reed being substantially perpendicular to the longitudinal axis of the stream, the reed substantially bisecting the stream, vibrating the reed at a frequency between about 20 and about 2000 cycles per second, with an amplitude of vibration greater than said inner dimension, the stream contacting the lateral surface of the reed at an antinode to form droplets of the liquid, and subsequently solidifying the droplets.

5. A process of forming solid spheres and spheroids from a molten material which comprises flowing a stream of the liquid from an outlet into contact with the lateral surfaces of a reed, the longitudinal axis of the reed being substantially perpendicular to the longitudinal axis of the stream and the thickness of the reed being less than the inner dimension of the outlet, the reed substantially bisecting the stream, vibrating the reed at a frequency between about 20 and about 2000 cycles per second, the stream contacting the lateral surface of the reed at an antinode to form droplets, the amplitude of vibration being greater than said inner dimension, and subsequently cooling the droplets below their solidification point.

6. A process of forming solid spheres and spheroids from a liquid solution which comprises flowing a stream of the solution into contact with lateral surfaces of a reed with a thickness less than the inner dimension of the outlet, the longitudinal axis of the reed being substantially perpendicular to the longitudinal axis of the stream, the reed substantially bisecting the stream, vibrating the reed at a frequency between about 20 and about 2000 cycles per second, the amplitude of vibration being greater than said inner dimension, the stream contacting the lateral surfaces of the reed at an antinode to form droplets, and subsequently removing the solvent from said solution droplets.

7. A process of forming solid spheres and spheroids from a solidifiable liquid which comprises flowing a stream of the liquid from an outlet into contact with a reed having a thickness less than the inner dimension of the outlet, the longitudinal axis of the reed being substantially parallel to the longitudinal axis of the stream, the reed substantially bisecting the stream, vibrating the reed at a frequency between about 20 and about 2000 cycles per second, the amplitude of vibration being greater than said inner dimension, the stream contacting the lateral surfaces of the reed at an antinode to form droplets, and subsequently solidifying the droplets.

8. An apparatus for forming solid spheres and spheroids from a solidifiable liquid which comprises a liquid outlet, a reed in alignment with and substantially bisecting an extrapolation of the outlet, and means for vibrating the reed.

9. An apparatus for forming solid spheres and spheroids from a solidifiable liquid which comprises a prilling tower, means for introducing an inert gaseous medium into the base of the tower, a liquid outlet centrally positioned approximate the top of the tower, a reed in alignment with and substantially bisecting an extrapolation of the outlet, and means for vibrating the reed.

10. An apparatus for forming solid spheres and spheroids from a solidifiable liquid which comprises a liquid outlet, a reed bisecting an extrapolation of the outlet, the longitudinal axis of the reed being substantially perpendicular to the longitudinal axis of the outlet, and means for vibrating the reed in a plane perpendicular to its longitudinal axis.

11. An apparatus for forming solid spheres and spheroids from a solidifiable liquid which comprises a liquid outlet, a reed bisecting an extrapolation of the outlet, the longitudinal axis of the reed being substantially parallel to the longitudinal axis of the outlet, and means for vibrating the reed in a plane parallel to its longitudinal axis.

References Cited by the Examiner

UNITED STATES PATENTS

| | | | |
|---|---|---|---|
| 194,271 | 8/1877 | Shiver | 18—2.7 |
| 2,392,072 | 1/1946 | Vang | 264—9 |
| 2,488,353 | 11/1949 | Unger | 18—2.6 |
| 2,544,678 | 3/1951 | Hancox et al. | 18—2.6 |
| 2,652,386 | 9/1953 | Wallman | 264—9 |
| 2,714,224 | 8/1955 | Schaub | 18—2.7 |
| 2,921,335 | 1/1960 | Bowers et al. | 18—2.7 |
| 2,931,067 | 4/1960 | Delaloye et al. | 18—47.2 |
| 2,968,833 | 1/1961 | De Haven | 18—2.4 |
| 3,048,887 | 8/1962 | Weiland | 18—2.7 |

FOREIGN PATENTS 613,727  11/1926  France.

ALFRED L. LEAVITT, *Primary Examiner*.

MICHAEL V. BRINDISI, ALEXANDER H. BRODMERKEL, ROBERT F. WHITE, *Examiners*.

L. D. RUTLEDGE, J. R. DUNCAN, R. B. MOFFITT,
*Assistant Examiners*.